United States Patent
Caldara

(10) Patent No.: US 10,668,621 B1
(45) Date of Patent: Jun. 2, 2020

(54) FAST MOTION PLANNING COLLISION DETECTION

(71) Applicant: Amazon Technologies, Inc., Seattle, WA (US)

(72) Inventor: Stephen A. Caldara, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 15/632,116

(22) Filed: Jun. 23, 2017

(51) Int. Cl.
*B25J 9/16* (2006.01)
*G06T 7/00* (2017.01)
*G06Q 50/28* (2012.01)

(52) U.S. Cl.
CPC ............ *B25J 9/1666* (2013.01); *G06Q 50/28* (2013.01); *G06T 7/0004* (2013.01)

(58) Field of Classification Search
None
See application file for complete search history.

(56) References Cited

U.S. PATENT DOCUMENTS

2007/0248260 A1* 10/2007 Pockett ................ H04N 13/327 382/154
2018/0058861 A1* 3/2018 Doria ..................... G01C 21/32

OTHER PUBLICATIONS

C. Vogel, M. Poggendorf, C. Walter and N. Elkmann, "Towards safe physical human-robot collaboration: A projection-based safety system," 2011 IEEE/RSJ International Conference on Intelligent Robots and Systems, San Francisco, CA, 2011, pp. 3355-3360.doi: 10.1109/IROS.2011.6094550 (Year: 2011) (Year: 2011).*

P. Renton, M. Greenspan, H. A. Elmaraghy, H. Zghal, "Plan-n-scan: A robotic system for collision-free autonomous exploration and workspace mapping", Journal of Intelligent and Robotic Systems, vol. 24, No. 3, pp. 207-234, 1999. (Year: 1999).*

Mcatee, Steven & Dunn, Michelle & Nagarajah, Romesh. (2014). Simulation scan comparison for process monitoring using 3D scanning in manufacturing environments. The International Journal of Advanced Manufacturing Technology. 74. 823-834. 10.1007/s00170-014-6037-7. (Year: 2014).*

(Continued)

*Primary Examiner* — Chan S Park
*Assistant Examiner* — Elisa M Rice
(74) *Attorney, Agent, or Firm* — Kilpatrick Townsend & Stockton LLP

(57) ABSTRACT

Techniques described herein include a system and methods for implementing fast motion planning of collision detection. In some embodiments, an area voxel map is generated with respect to a three-dimensional space within which a repositioning event is to occur. A number of movement voxel maps are then identified as being related to potential repositioning options. The area voxel map is then compared to each of the movement voxel maps to identify collisions that may occur with respect to the repositioning options. In some embodiments, each voxel map includes a number of bits which each represent voxels in a volume of space. The comparison between the area voxel map and each of the movement voxel maps may include a logical conjunction (e.g., an AND operation). Movement voxel maps for which the comparisons result includes a value of 1 are then removed from a set of valid repositioning options.

20 Claims, 10 Drawing Sheets

(56) References Cited

OTHER PUBLICATIONS

Vandenberg, Jack Snoeyink, Ming Lin, Dinesh Manocha, "Centralized path planning for multiple robots: Optimal decoupling into sequential plans", Proc. Robotics: Science and Systems—RSS'09, 2009. (Year: 2009).*

Aghamohammadi, "Confidence-aware Occupancy Grid Mapping: A Planning-Oriented Representation of Environment", Sep. 2016 (Year: 2016).*

* cited by examiner

FAST MOTION PLANNING COLLISION DETECTION

BACKGROUND

Modern inventory systems, such as those in mail order warehouses, supply chain distribution centers, and custom-order manufacturing facilities, face significant challenges in preventing collisions between inventory management components. As inventory systems grow, the challenges of simultaneously completing a large number of packing, storing, and other inventory-related tasks while avoiding collisions become non-trivial. In inventory systems tasked with responding to large numbers of diverse inventory requests, inefficient utilization of system resources, including space, equipment, and manpower, can result in inventory components (e.g., robotic units) traveling along a number of different routes. Increasing the number of requests to inventory management system components may increase the risk of collision dramatically.

Collision detection typically refers to the computational problem of detecting the intersection of two or more objects. Conventional approaches to collision detection for multiple objects are often very slow and resource intensive. Checking every object against every other object will work, but is often too inefficient to be used when the number of objects is large. This inefficiency is increased with when checking objects with complex geometry against each other. Thus, considerable research has been applied to speed up the problem.

BRIEF DESCRIPTION OF THE DRAWINGS

Various embodiments in accordance with the present disclosure will be described with reference to the drawings, in which.

DETAILED DESCRIPTION

Figure 1:
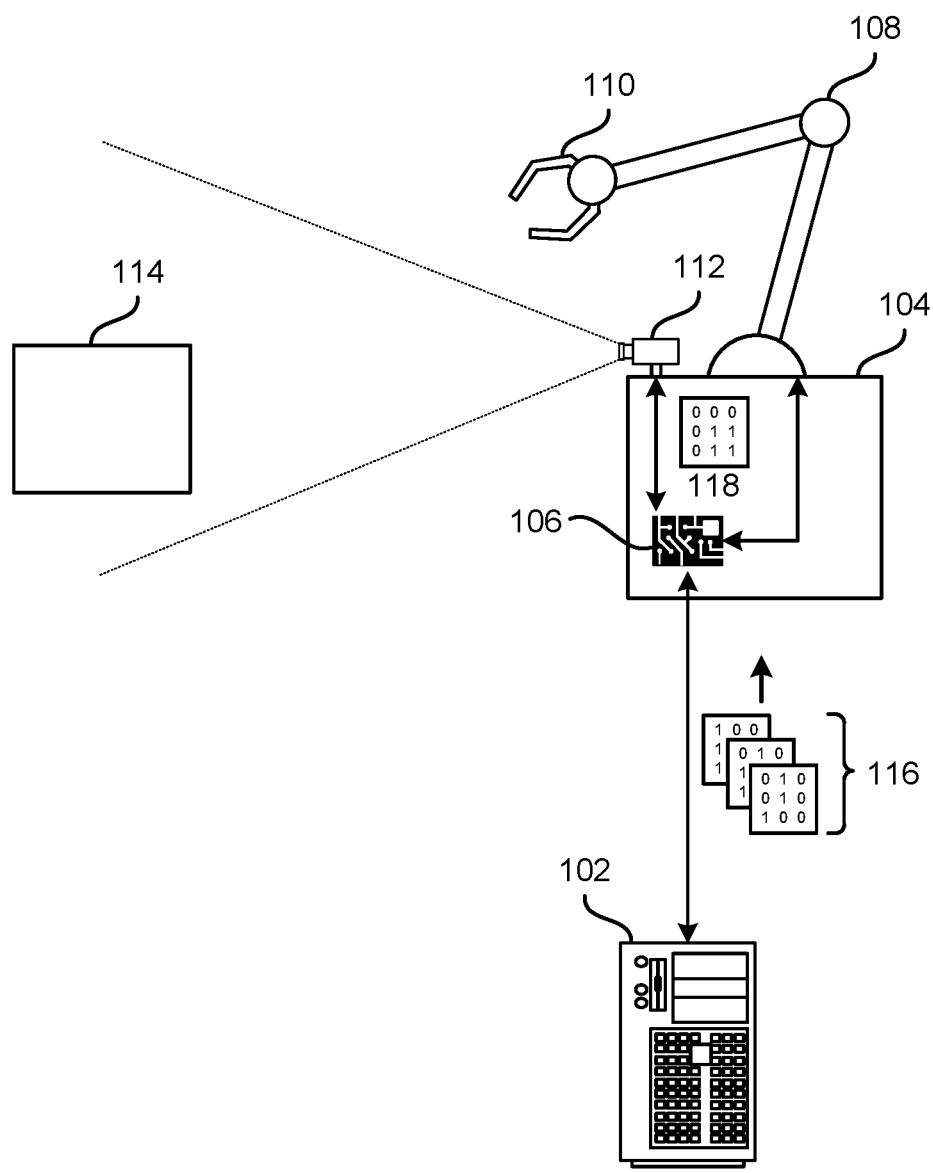
FIG. 1 depicts a an example implementation in which a robotic unit has been configured to implement at least one collision avoidance technique in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and methods for implementing fast motion planning of collision detection. In some embodiments, the system may include an integrated circuit which is configured to perform a bitwise AND operation between two voxel map data files. In some embodiments, an area voxel map is generated with respect to a three-dimensional space within which a repositioning event is to occur. A number of movement voxel maps are identified as being related to potential repositioning options (movements calculated to result in the completion of the repositioning event). The movement voxel maps can be computed in real time or they can be precomputed (e.g., offline). The area voxel map is then compared to each of the movement voxel maps to identify collisions that may occur with respect to the repositioning options. In some embodiments, once a repositioning option is identified which results in no collision, that repositioning option is executed. In some embodiments, a set of valid repositioning options is generated to include a number of repositioning options that do not result in collisions. The system is then able to select from this set of repositioning options.

By way of illustrative example, a robotic unit within an inventory management system may determine that it needs to reposition a mechanical arm from a first position to a second position. In this illustrative example, the robotic unit may identify a number of different ways in which the mechanical arm may be moved and may generate movement instructions that, when performed, would cause the mechanical arm to move from the first position to the second position. In this example, each of the number of different ways in which the mechanical arm may be moved is associated with a movement voxel map. In some embodiments, the memory of the robotic unit may be preloaded (e.g., by a manufacturer or administrator) with a number of movement voxel maps corresponding to various movements. In some embodiments, the robotic unit may generate a movement voxel map for a series of movements by performing one or more bitwise OR operations to combine voxel maps associated with individual movements. In some embodiments, movement voxel maps for these movements may be generated by a control unit and provided to the robotic unit.

Continuing with the example above, the robotic unit (or a control unit) may identify a three-dimensional space within which the repositioning event is to occur. The robotic unit (or the control unit) may then obtain information related to objects or obstructions within that three-dimensional space and may generate an area voxel map which represents that three-dimensional space. For example, the robotic unit may use a depth sensor to detect objects at various depths, which may then be translated into an area voxel map.

Once an area voxel map is generated to represent the three-dimensional space, the robotic unit may compare the area voxel map representing the three-dimensional space to each of the movement voxel maps to identify the movements that do not result in a collision. This may involve performing a bitwise AND operation between the two voxel maps and determining whether the result set for the operation includes any values of 1. The system is then able to execute movement instructions that do not indicate a collision.

FIG. 1 depicts an example implementation in which a robotic unit has been configured to implement at least one collision avoidance technique in accordance with embodiments of the disclosure. A control unit 102 in communication with the robotic unit 104 may include any system associated with an entity that provides a resource or service. In some embodiments, the control unit 102 may handle functionality of a computer application associated with the entity that provides the resource or service. In the current disclosure, a control unit 102 may include a computing system in which at least a portion of the disclosed techniques are implemented. The control unit 102 may include one or more special-purpose hardware devices for implementing the described techniques. In some embodiments, the control unit may provide instructions and/or data files to an integrated circuit 106 installed within the robotic unit 104. The integrated circuit 106 may be any type of hardware circuit, such as an application-specific integrated circuit (ASIC), field-programmable gate array (FPGA), microcontroller, microprocessor, graphics processing unit (GPU), or system on chip (SoC).

The control unit 102 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the control unit 102 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

The robotic unit 104 may comprise any robotic device configured to traverse an area and/or move items from one location to another. The robotic unit 104 may include one or more mechanical arms 108 with an end-of-arm tool (EOAT) 110. This is described in greater detail below. It should be noted that although a particular example robotic unit 104 is depicted in FIG. 1, the robotic unit 104 may be any suitable robotic device, stationary or mobile, which has that capability to perform the described functions. In some embodiments, the mechanical arm of a robotic unit 104 may include any number of degrees of freedom. Additionally, a robotic unit 104 may include any number of sensor devices 112, capable of obtaining input related to an environment in which the robotic unit 104 is present. In some embodiments, the input sensor devices 112 may include camera devices configured to collect input pertaining to objects 114 within the environment of the robotic unit. In some embodiments, data may be received by the integrated circuit 106 from a control unit 102 and/or one or more input sensors 112. That data may then be used to generate instructions to be provided to a mechanical arm 108 of the robotic unit.

In some embodiments, the control unit 102 may maintain voxel maps 116 associated with a number of repositioning commands. A voxel map may consist of a data file that includes a representation of a three-dimensional space. A voxel (e.g., a volume pixel) may consist of each of an array of elements of volume that constitute a notional three-dimensional space. The voxel map may include a number of binary indicators that represent a current status (e.g., empty or filled) of each voxel in the three-dimensional space. In some embodiments, the control unit 102 may provide the robotic unit 104 with movement voxel maps that represent repositioning events and/or area voxel maps that represent the area surrounding the robotic unit 104. Additionally, the control unit 102 may receive an indication of the robotic units position (e.g., location and/or pose) and may generate an area voxel map associated with the environment surrounding the robotic unit. For example, the control unit 102 may obtain information related to objects 114 in the environment, other robotic units, and bounds of a navigational space. This information may be obtained from input sensors, information received from robotic units, blueprints, or any other suitable data sources available to the control unit 102.

In some embodiments, the input sensor devices 112 of the robotic unit 104 may be used to obtain information related to the environment in which the robotic unit 104 is located and generate an area voxel map. The input sensors may include any suitable sensor device capable of obtaining information related to objects/or positioning of objects within an environment, including radar devices, sonar devices, ultrasound devices, infrared devices, light detection and ranging (LIDAR) devices, stereo vision camera devices, etc. For example, the input sensors may include depth sensors (e.g., range cameras) that are used to generate range maps of objects in proximity to the robotic unit. The obtained range map may then be used to generate an area voxel map 118 of the area surrounding the robotic unit 104. In another example, the input sensor devices 112 may include one or more cameras. In this example, the robotic unit may obtain image information from those camera devices that depicts the environment surrounding the robotic unit.

For the purposes of this disclosure, a depth sensor (e.g., a range camera) may be any device configured to identify a distance or range of an object or objects. In some embodiments, the range camera may generate a range image, in which pixel values correspond to the detected distance for that pixel. The pixel values can be obtained directly in physical units (e.g., meters). In at least some embodiments of the disclosure, the robotic unit 104 and/or the control unit 102 may employ a range camera that operates using structured light. In a range camera that operates using structured light, a projector projects light onto an object or objects in a structured pattern. The light may be of a range that is outside of the visible range (e.g., infrared or ultraviolet). The range camera may be equipped with one or more camera devices configured to obtain an image of the object with the reflected pattern. Distance information may then be generated based on distortions in the detected pattern. It should be noted that although this disclosure focuses on the use of a range camera using structured light, any suitable type of range camera, including those that operate using stereo triangulation, sheet of light triangulation, time-of-flight, interferometry, coded aperture, or any other suitable technique for range detection, would be useable by the described system.

Once obtained, the robotic unit may utilize one or more computational techniques (e.g. machine vision) to identify objects in its environment and to generate an area voxel map. Once an area voxel map of the area surrounding the robotic unit has either been generated by the robotic unit 104, or has been supplied by the control unit 102, the integrated circuit 106 may compare that area voxel map 118 to each of the relevant movement voxel maps 116 representing repositioning events in order to detect potential collisions.

In some embodiments, a comparison of the area voxel map may be made to a movement voxel map by performing a logical conjunction operation. One example of performing such a logical conjunction operation may include performing a bitwise AND operation between each pair of voxel maps. A bitwise AND takes two equal-length binary representations and performs a logical AND operation on each pair of the corresponding bits, by multiplying them in the Galois field of two elements (GF(2)). Thus, if both bits in a compared position are 1, the bit in the resulting binary representation is 1 (1×1=1); otherwise, the result is 0 (1×0=0 and 0×0=0). The bitwise AND operation is then performed for each of the bits in the area voxel map against the corresponding bits in all of the movement voxel maps. If any of the resulting bits return a 1, then the integrated circuit 106 may detect a potential collision. The integrated circuit may include a number of AND gates which enable the integrated circuit to perform multiple bitwise AND operations in parallel. An AND gate is a basic digital logic gate that implements the logical conjunction. In some embodiments, an AND gate may be designed using N-channel or P-channel metal-oxide-semiconductor field-effect transistors (MOSFETs). In some embodiments, a bitwise AND comparison may involve a MIN (minimum) operation. For example, MIN (0, 1)=0 whereas MIN (1, 1)=1.

It should be noted that although the description within the disclosure focuses on the performance of a bitwise AND operation, embodiments of the disclosure may utilize any appropriate logical conjunction operation. For example, in some embodiments, voxel maps may be generated so that zeros represent obstructed spaces and ones represent empty (e.g., unobstructed) spaces. In these embodiments, a bitwise OR operation, or the use of a NAND gate, could be used to detect a collision (e.g., with a zero indicating a collision). One skilled in the art would recognize these other logical conjunction operations as being equivalent to the ones described herein.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
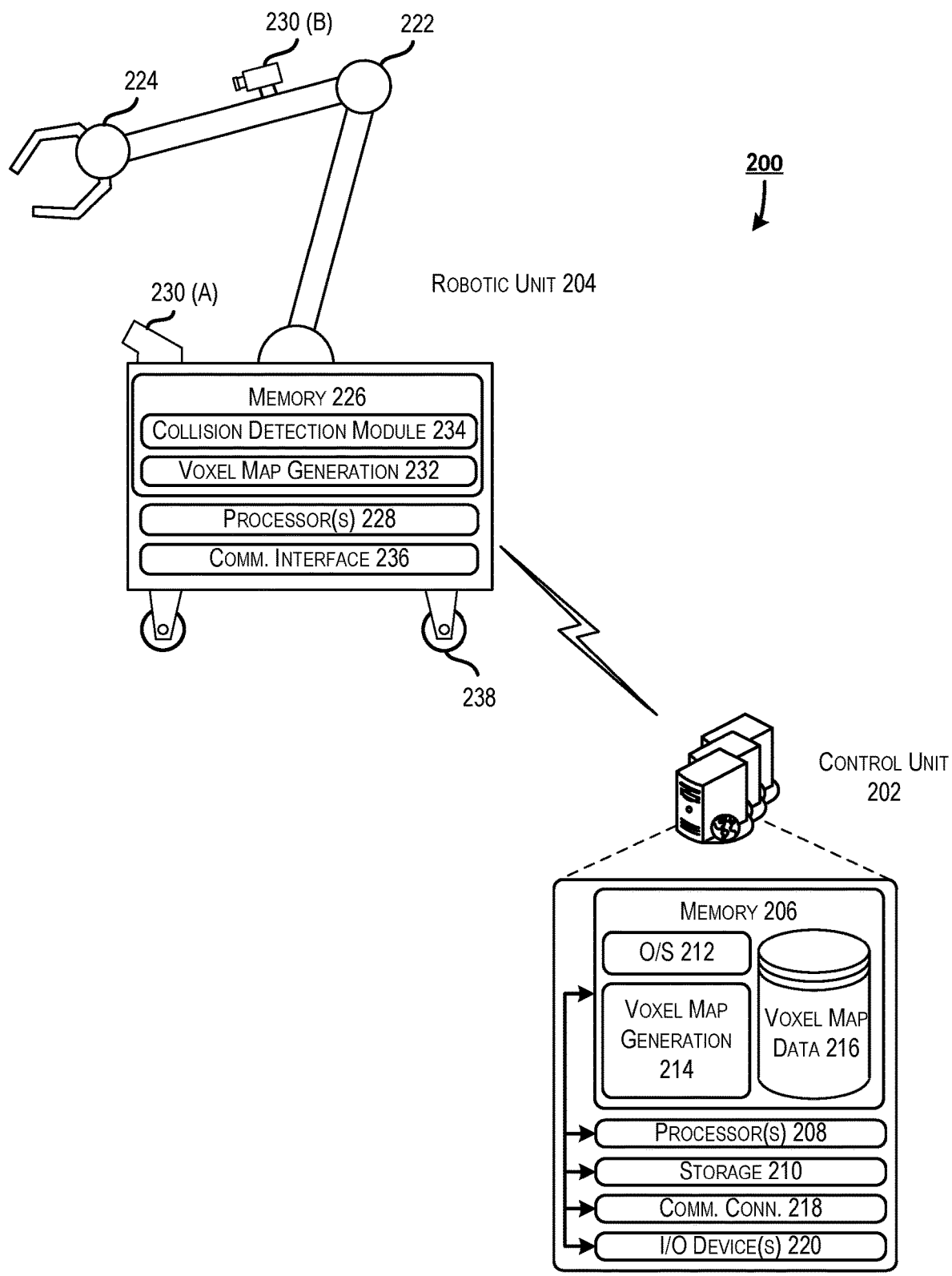
FIG. 2 illustrates an example system architecture that may be implemented in accordance with embodiments of the disclosure.

FIG. 2 illustrates an example system architecture that may be implemented in accordance with embodiments of the disclosure. In system architecture 200, a control unit 202 may be in communication with inventory management components, such as a robotic unit 204. A control unit 202 may be an example control unit 102 depicted in FIG. 1. A robotic unit 204 may be an example robotic unit 104 depicted in FIG. 1. It should be noted that the control unit 202 may be in communication with a number of robotic units 204. Similarly, the robotic unit 204 may be in communication with a number of control units 202.

The control unit 202 may be any type of computing device configured to communicate with and one or more of the system components. In some embodiments, the control unit 202 may be executed by one more virtual machines implemented in a hosted computing environment. The hosted computing environment may include one or more rapidly provisioned and released computing resources, which computing resources may include computing, networking, and/ or storage devices. A hosted computing environment may also be referred to as a cloud-computing environment.

In one illustrative configuration, the control unit 202 may include at least one memory 206 and one or more processing units (or processor(s)) 208. The processor(s) 208 may be implemented as appropriate in hardware, computer-executable instructions, firmware or combinations thereof. Computer-executable instruction or firmware implementations of the processor(s) 208 may include computer-executable or machine executable instructions written in any suitable programming language to perform the various functions described.

The memory 206 may store program instructions that are loadable and executable on the processor(s) 208, as well as data generated during the execution of these programs. Depending on the configuration and type of control unit 202, the memory 206 may be volatile (such as random access memory (RAM)) and/or non-volatile (such as read-only memory (ROM), flash memory, etc.). The control unit 202 may also include additional storage 210, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 206 may include multiple different types of memory, such as static random access memory (SRAM), dynamic random access memory (DRAM) or ROM. Turning to the contents of the memory 206 in more detail, the memory 206 may include an operating system 212 and one or more application programs or services for implementing the features disclosed herein including at least a module for generating voxel maps (voxel map generation module 214). The memory 206 may also include voxel map data 216, which provides information associated various repositioning events. In some embodiments, the voxel map data 216 may be stored in a database.

The memory 206 and the additional storage 210, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 218 that allow the control unit 202 to communicate with a stored database, another computing device or server, user terminals, and/or other components of the inventory system. The control unit 202 may also include input/output (I/O) device(s) and/or ports 220, such as for enabling connection with a keyboard, a mouse, a pen, a voice input device, a touch input device, a display, speakers, a printer, etc.

Turning to the contents of the memory 206 in more detail, the memory 206 may include an operating system 212, a database containing voxel map data 216 and the one or more application programs or services for implementing the features disclosed herein, including an voxel map generation module 214. In some embodiments, the voxel map generation module 214 may be configured to, in conjunction with the processors 208, generate an area voxel map that is representative of an area in the vicinity of a robotic unit. To do this, the voxel map generation module 214 may separate a space around the robotic unit into a number of voxels. The voxel map generation module 214 may then determine whether any portion of each of those voxels is occupied by an object. Each voxel that is occupied at least partially may be marked as being occupied (e.g., with the value "1"). In some embodiments, the area voxel map may be generated from blueprint data or other layout data. For example, the control unit may determine the location of the robotic unit with respect to a blueprint or geographical map. The control unit may then generate an area voxel map respective to that robotic unit's location and position from the blueprint. In some embodiments, the voxel map generation module 214 may obtain information from one or more sensors in the vicinity of the robotic unit (or from the robotic unit itself) and may generate an area voxel map from that data. It should be noted that the voxel map generation module 214 may be configured to generate an area voxel map which reflects a relative position of the robotic unit. For example, the area voxel map may be generated to reflect the three-dimensional area directly in front of the robotic unit.

Voxel map data 216 may be predetermined or it may be dynamically generated. For example, voxel map data associated with a repositioning event may be updated as new information is received on that repositioning event. In some embodiments, the voxel map data 216 may include information related to positions of a robotic arm and the voxels that are occupied during a transition from/to those positions. In some embodiments, the voxel map data 216 may include information related to a mobile unit traversing a navigation space.

In one illustrative configuration, the robotic unit 204 may include at least one memory 226 and one or more processing units (or processor(s)) 228. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described. Additionally, the robotic unit 204 may comprise a number of input sensors 230 (A and B), which detect and provide input related to conditions of an environment that the robotic unit 204 is located within.

The memory 226 may store program instructions that are loadable and executable on the processor(s) 228, as well as data generated during the execution of these programs. The memory 226 may include one or more application programs or services for implementing the features disclosed herein including at least a module for generating voxel maps from depth information (voxel map generation module 232). The memory 226 may also include voxel map data 234, which provides information associated with repositioning events received from the control unit 202. The memory 226 may also include a collision detection module 234, which determines whether a combination of two voxel maps will result in a collision.

In accordance with at least some embodiments, the voxel map generation module 232 may be configured to, in conjunction with the processors 228, generate an area voxel map from obtained depth information (e.g., a range map). It should be noted that some embodiments of the system described herein may use a voxel map generation module 214 while some embodiments of the system described herein may use a voxel map generation module 232. Although both are depicted in FIG. 2, some embodiments may only use one or the other (e.g., the area voxel map of the three-dimensional space is generated by either the control unit or the robotic unit). In embodiments that include a voxel map generation module 232, the robotic unit may obtain information related to a three-dimensional space via input sensors 230 (A and B). In some embodiments, the robotic unit may then use one or more computational techniques (e.g. machine vision) to identify objects/obstructions in that three-dimensional space. In some embodiments, the robotic unit may use a depth sensor (e.g., a range camera) to detect objects/obstructions in the three-dimensional space. The voxel map generation module 232 may then generate an area voxel map of the three-dimensional space by generating a data file such that bits within the data file correspond to locations within the three-dimensional space. The voxel map generation module 232 then assigns either a "1" or a "0" to each bit in the data file based on whether its corresponding location is at least partially filled (e.g., any location which is at least partially filled is assigned a "1"). In some embodiments, the voxel map generation module 232 may assign a "1" value to bits associated with locations that it is not able to determine whether it is empty or full. For example, in a range map, the robotic unit may be provided with information that includes a depth at which an object may be located, but no information related to how deep that object is. In this scenario, the voxel map generation module 232 may assign a "1" value to any bit associated with a location that would fall behind the object in the range map.

In accordance with at least some embodiments, the collision detection module 234 may be configured to, in conjunction with the processors 228, compare voxel maps to determine whether a collision might occur. In some embodiments, the collision detection module 234 may be implemented as programmatic instructions on an integrated circuit chip. When a repositioning event is to occur (e.g., the robotic unit is to traverse to another location or to move a mechanical arm 222), The collision detection module 234 may receive an area voxel map corresponding to a three-dimensional space (e.g., the area voxel map generated by the voxel map generation module 214 or voxel map generation module 232) and movement voxel maps corresponding to a potential repositioning option. Upon receiving these voxel maps, the collision detection module 234 may perform a bitwise AND comparison of each bit in the area voxel map and a corresponding bit in a movement voxel map. In some embodiments, the collision detection module 234 may return a status for the pair of voxel maps (e.g., pass or fail). In some embodiments, the collision detection module 234 may continue to compare corresponding bits until the end of at least one of the voxel maps is reached (i.e., a "pass") or until the bitwise AND operation results in the first "1" value (i.e., a "fail"). This may be repeated for each of a number of identified potential repositioning options to quickly determine which of those options would result in a collision.

The robotic unit 204 may include a communication interface 238 that allow the robotic unit 204 to communicate with the control unit 202, another computing device or server, user terminals, and/or other components of the system. In some embodiments, the communication interface 236 may comprise a wireless communication mechanism. In some embodiments, the communication interface 236 may comprise a physical wired connection with other components of the system.

In some embodiments, the robotic unit 204 may be stationary (e.g., incapable of movement). In some embodiments, the robotic unit 204 may be mobile, in that the robotic unit 204 is configured to traverse from a first location to a second location. For example, the robotic unit 204 may be configured to traverse to a first location, retrieve an item at the first location, traverse to a second location, and place the item at the second location. In these embodiments, the robotic unit 204 may include any suitable mobility means 238. For example, the robotic unit 204 may include wheels and a motorized engine, such that the robotic unit 204 is capable of autonomous movement. In this example, the memory 226 may include a collision detection module 234, which may be configured to perform automated route guidance. In another example, the robotic unit 204 may be located on a track or conveyor belt.

Figure 3:
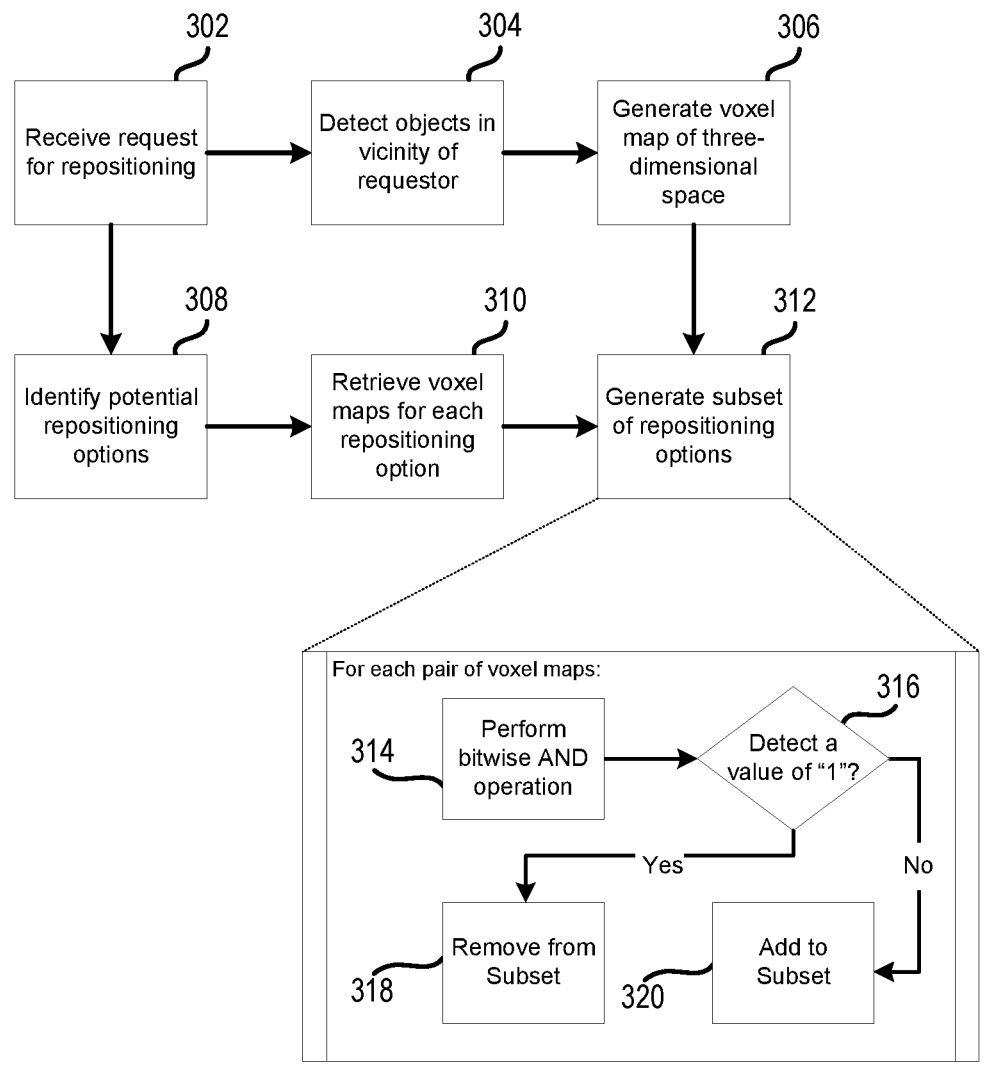
FIG. 3 depicts an example process data flow that may be implemented in accordance with at least some embodiments.

FIG. 3 depicts an example process data flow that may be implemented in accordance with at least some embodiments. In FIG. 3, a robotic unit may receive an instruction to reposition. At least a portion of the process 300 depicted in FIG. 3 may be performed by an integrated circuit such as an application-specific integrated circuit (ASIC), field-programmable gate array (FPGA), microcontroller, microprocessor, graphics processing unit (GPU), or system on chip (SoC). In some embodiments, at least some of the process 300 depicted in FIG. 3 may be performed by the control unit 202 depicted in FIG. 2.

Process 300 may begin at 302, when a request is received in relation to a repositioning event. The repositioning event may include any event in which at least a portion of the robotic unit is to be moved through some space. In some embodiments, the repositioning event may be identified from a list of available repositioning event types. In some embodiments, the repositioning event may include an indication of a starting position and an ending position. The repositioning event may also pertain to the retrieval of one or more items from a storage location.

At 304, a three-dimensional space may be identified based on one or more objects detected in an area relevant to the repositioning event. In some embodiments, the one or more objects may be detected using one or more computational techniques (e.g., machine vision), depth sensor information, blueprints or other planning documents, or any combination of these and/or other suitable data sources. In some embodiments, the three-dimensional space may be identified as being of a particular size. For example, the system may maintain a standard voxel map data file size and the three-dimensional space may be selected so that it results in the generation of a voxel map of that size. In other words, the three-dimensional space may be selected so that it contains the same number of voxels as the voxel map contains bits.

At 306, an area voxel map may be generated for the identified three-dimensional space. An example process for generating an area voxel map from a three-dimensional space is presented with respect to FIG. 4 described below.

At 308, one or more potential repositioning options may be identified for the repositioning event. In some embodiments, each repositioning option may represent a method of moving from the starting position to an ending position. A repositioning option may include any number of movements, in any order, which are calculated to result in the requested repositioning being completed. The repositioning options may be predetermined (e.g., pre-programmed) or they may be generated dynamically. In the event that the repositioning options are dynamically generated, the repositioning options may be generated using any technique. For example, the system may utilize one or more machine learning algorithms to identify appropriate patterns of movements which would result in completion of the requested repositioning. In another example, the system may generate a repositioning option by selecting a chain of movements (either randomly or in a particular order).

At 310, movement voxel maps associated with each of the identified repositioning options may be retrieved. Each repositioning option may be associated with a movement voxel map that represents an indication of which spaces the movements associated with the repositioning option occupy at some point in time during execution of the repositioning option. An example of a process for generating a movement voxel map from one or more movements associated with a repositioning option is described below with respect to FIG. 6 and FIG. 7. In some embodiments, the movement voxel maps may be generated prior to initiation of the described process. In some embodiments, the movement voxel maps may be generated dynamically. For example, movement voxel maps may be generated for each repositioning option as that repositioning option is identified.

At 312, the identified repositioning options may be filtered into a subset of the repositioning options by identifying potential collisions. In some embodiments, this may be done using an integrated circuit installed within a robotic unit. To filter repositioning options into a subset, the system may compare the area voxel map representing the three-dimensional space generated at 306 with each of the movement voxel maps retrieved at 310 in relation to the repositioning options. The comparison is used to determine whether there is likely to be a collision. Each repositioning option that is associated with a movement voxel map that does not result in a collision is included in the subset whereas each repositioning option that is associated with a movement voxel map that does result in a collision is removed. In this way, the system identifies a subset of repositioning options that are not likely to result in a collision.

At 314 during the comparison process, a bitwise AND operation may be performed in order to identify potential collisions. During the bitwise AND operation, corresponding bits in the two voxel maps are multiplied together. At 316, if any of the resultant products for any of the bits is equal to 1, then a collision is detected. Upon detecting a collision, the system may remove the repositioning option from the set of available repositioning options at 318. In some embodiments, this may be done as soon as a value of 1 is obtained (e.g., before the entire voxel maps are compared). If, however, the bitwise AND operation is completed without obtaining a value of 1, then the repositioning option is a valid option and may be added to the subset of available repositioning options at 320.

In some embodiments, steps 314 through 320 may be repeated for each identified repositioning option to identify those repositioning options which do not result in a collision. The system may then select the best available repositioning option from the subset of available repositioning options. In some embodiments, the process may exit as soon as a repositioning option is identified that does not result in a collision, creating a subset that includes a single repositioning option.

Figure 4:
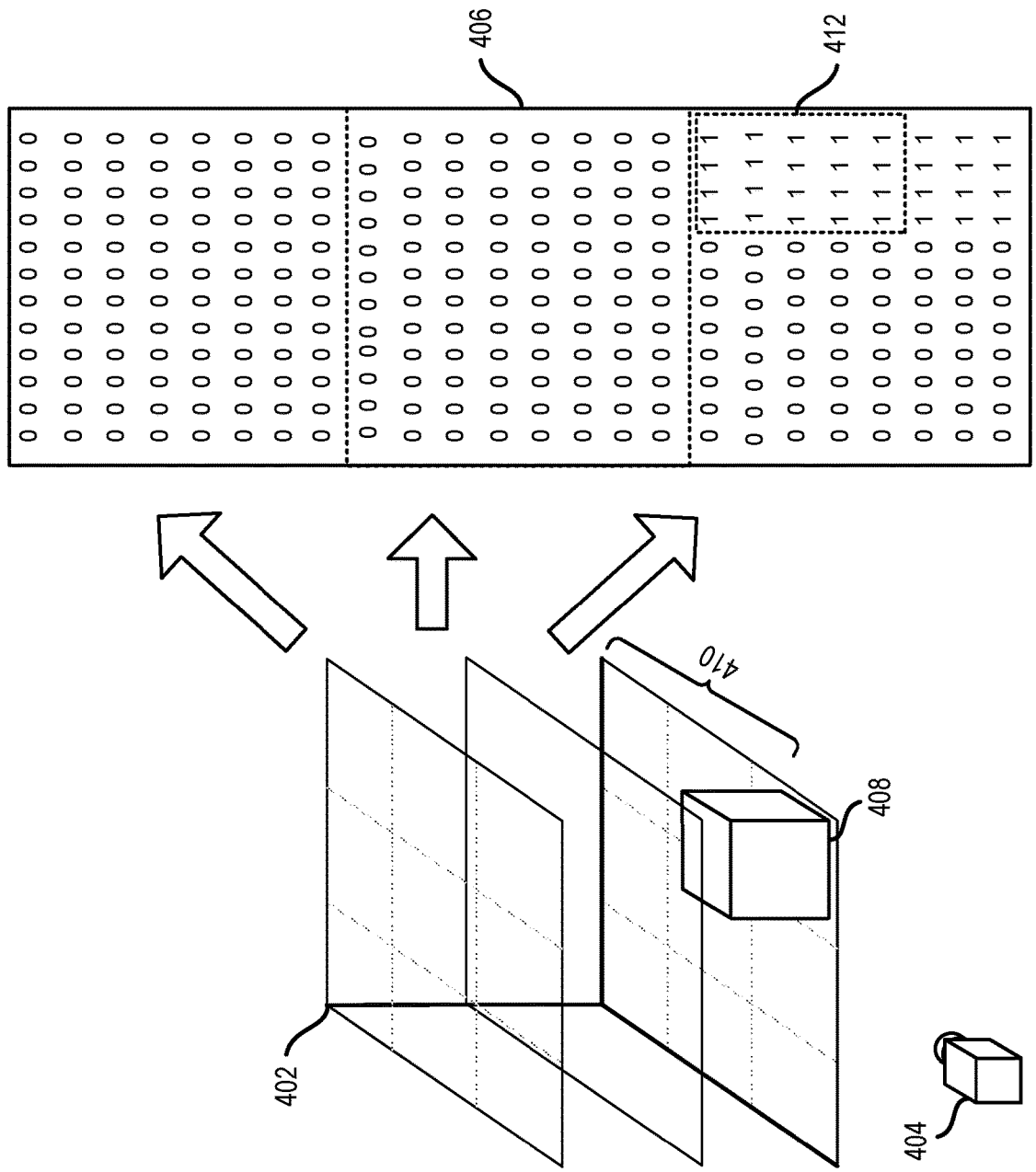
FIG. 4 depicts an illustrative example of a process for generating an area voxel map from a three-dimensional space in accordance with at least some embodiments.

FIG. 4 depicts an illustrative example of a process for generating an area voxel map from a three-dimensional space in accordance with at least some embodiments. In FIG. 4, a three-dimensional space 402 is identified as being relevant to a repositioning event. For example, the three-dimensional space may be one in which the repositioning event is to occur (e.g., the robotic unit will traverse the three-dimensional space 402 or move a mechanical arm within the three-dimensional space 402. In some embodiments, the process 400 may be performed by the voxel map generation module 214 of the control unit 202 depicted in FIG. 2. In some embodiments, the process 400 may be performed by the voxel map generation module 232 of the robotic unit 204 depicted in FIG. 2.

In some embodiments, information related to the three-dimensional space 402 may be obtained from one or more input sensors 404, which may include at least a camera device or depth sensor. An area voxel map 406 of the three-dimensional space may be generated from the perspective of the input sensors 404. The three-dimensional space may be broken up into a number of voxels. Each voxel may then be mapped to a bit value in the area voxel map. In some embodiments, the three-dimensional space may be segregated into multiple layers. In these embodiments, each layer may correspond to a different section of the area voxel map.

Once the three-dimensional space has been mapped to the area voxel map 406 data file, each bit in that area voxel map 406 may be assigned either a 1 or a 0 based on whether the voxel associated with that bit is empty. In some embodiments, only completely empty voxels may be assigned a 0. When the information indicates the presence of an object 408 within one or more voxels, each of the voxels occupied by that object 408 may be assigned a value of 1. In some embodiments, if the input sensor 404 is unable to determine whether a particular voxel is empty or obstructed, the bit associated with that voxel in the area voxel map may be assigned a value of 1. For example, if some number of voxels 410 is hidden from the viewpoint of the input sensors 404, then the bits 412 associated with the hidden voxels 410 may be assigned a 1.

It should be noted that a voxel may represent any size volume of space. One skilled in the art would recognize that voxels representing smaller volumes would result in systems that perform with a higher degree of accuracy at the cost of generating larger area voxel maps, and requiring more processing power. Accordingly, the system may determine an appropriate size of voxels to use in a voxel map based on the needs/constraints of the system. Voxels within a voxel map may or may or may not be uniform in size and/or shape. It should be noted that in any given embodiment, there may be voxel maps with different levels of granularity (e.g. a first for moving the entire mechanical arm, a second for fine positioning to grab an object out of smaller controlled space, etc.). In an example embodiment implemented in a mobile robotic unit, a first set of voxel maps might have large voxels for moving through areas which have no observed obstructions. The mobile robotic unit may then switch to a finer granularity voxel map when proceeding to maneuver around an obstacle.

Figure 5:
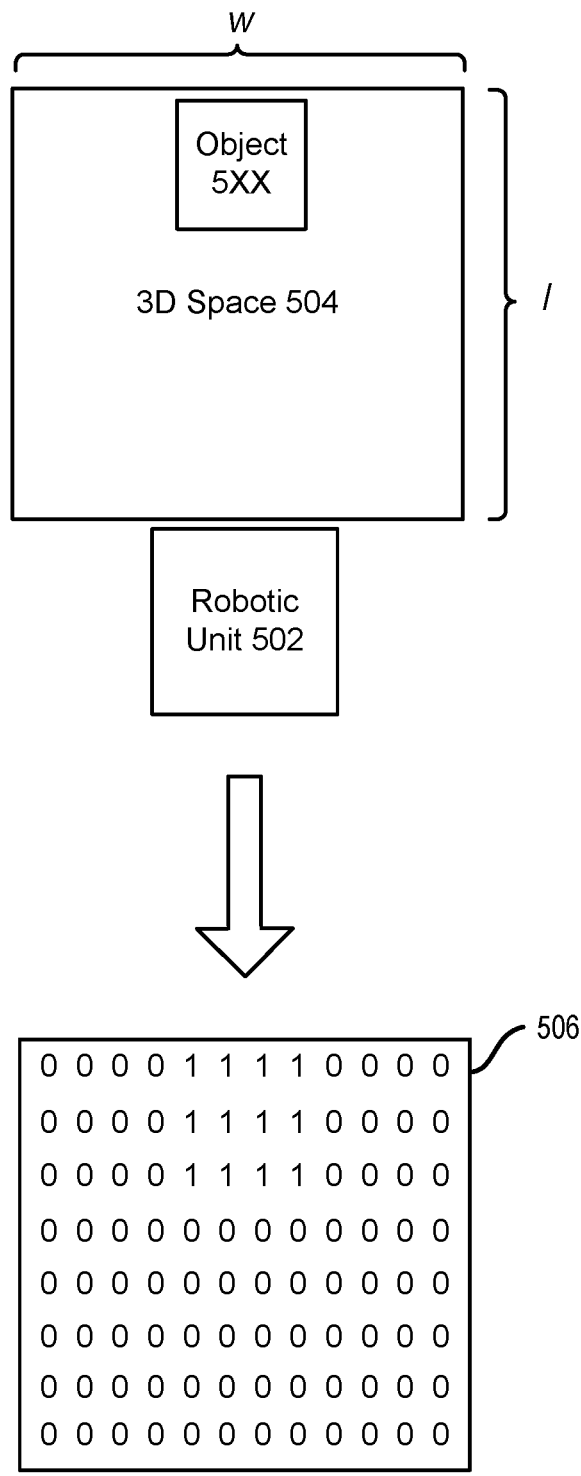
FIG. 5 depicts a process for selecting a three-dimensional space and generating an area voxel map in accordance with at least some embodiments.

FIG. 5 depicts a process for selecting a three-dimensional space and generating an area voxel map in accordance with at least some embodiments. In FIG. 5, a robotic unit 502 may determine that a repositioning event is needed. For example, the robotic unit may need to position a mechanical arm in front of a storage location in order to grasp an item. In another example, the robotic unit may determine that it needs to traverse to a new location. The process described in FIG. 5 may be performed by a control unit, a robotic unit, or any other suitable entity to generate an area voxel map.

A three-dimensional space 504 may be identified as being relevant to the repositioning event. In some embodiments, the length (l), width (w), and height of three-dimensional space may be selected so that the three-dimensional space 502 includes an area through which the robotic unit 502, or some portion of the robotic unit 502 (e.g., a mechanical arm), is to traverse. Additionally, the three-dimensional space 504 may be selected such that an area voxel map 506 generated to reflect that three-dimensional space 504 is aligned with one or more voxel maps representing repositioning options. For example, the area voxel map may be generated such that the voxels associated with particular bits within a movement voxel map associated with a repositioning option would align with voxels in the three-dimensional space. For example, if the repositioning event involves movement of a mechanical arm, then the three-dimensional space should be selected such that the mechanical arm's movement in the area voxel map aligns with the mechanical arm's movement through the three-dimensional space. In some embodiments, the size (e.g., in voxels) of the three-dimensional space to be identified may be determined based on a size of the voxel maps associated with the repositioning events. In some embodiments, the area voxel map may be generated from the three-dimensional space based on blueprints or other suitable documents.

In some embodiments, the area voxel map for the three-dimensional space may be generated using input from one or more input sensors as well as layout data. For example, the system may include a "floor" (a space throughout which one or more robotic units may traverse) which includes a number of input sensor devices. For example, the system may be an inventory management system that includes an inventory floor which has cameras positioned to capture input related to objects traversing the inventory floor. In this example, a voxel may for a three-dimensional space be populated by first identifying a robotic unit's position within the floor. The system may then identify a corresponding position within a layout document (e.g., a blueprint or map) which includes information related to walls or other stationary obstructions. Based on the information in the layout document, the system may populate an area voxel map with initial obstruction information. The system may then identify one or more objects within the floor based on input information received from the input sensor devices included in the system (e.g., other robotic units, temporarily-positioned objects, etc).

Although FIG. 5 depicts the relevant three-dimensional space as being directly in front of the robotic unit, it should be noted that the relevant three-dimensional space may be selected to have any particular relevance to the robotic unit. For example, in some embodiments, the three-dimensional space may be selected such that it is centered on the robotic unit.

Figure 6:
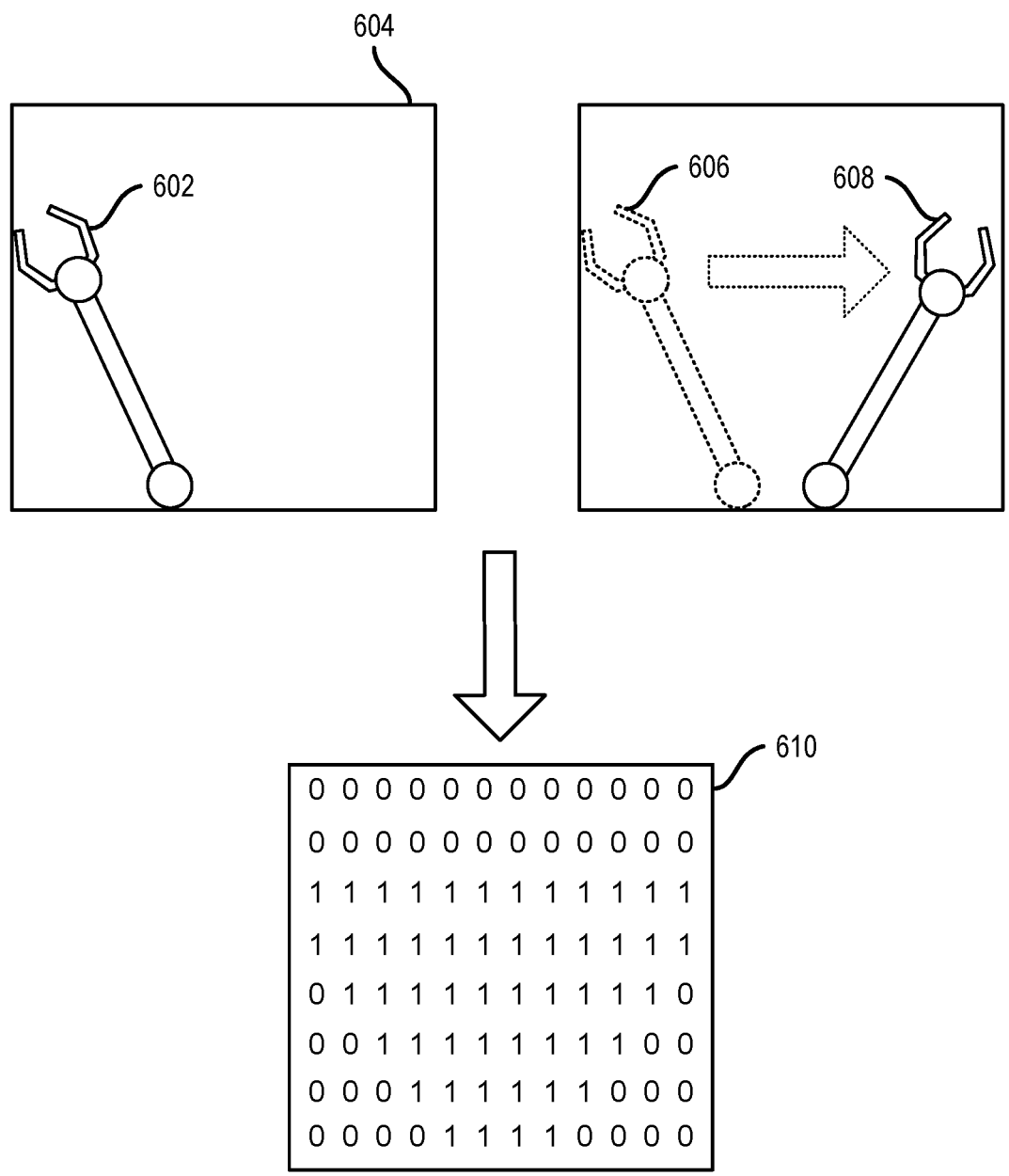
FIG. 6 depicts a first example of a movement voxel map that may be generated for a repositioning option in accordance with at least some embodiments.

FIG. 6 depicts a first example of a movement voxel map that may be generated for a repositioning option in accordance with at least some embodiments. In particular, FIG. 6 pertains to a repositioning option that includes a first method of moving a mechanical arm 602 through a three-dimensional space 604. In FIG. 6, the mechanical arm 602 is repositioned from a starting position 606 to an ending position 608 within the three-dimensional space 604.

In some embodiments, each repositioning option may be associated with some movement (e.g., a movement of the mechanical arm 602). As depicted, the first method of moving the mechanical arm 602 involves swinging the mechanical arm from the starting position 606 straight across to the ending position 608. Once this movement is identified, a movement voxel map 610 is generated for the repositioning option based on that movement.

For each movement corresponding to a repositioning option, the system may identify a starting position 606 and an ending position 608. The system may then identify each of the voxels that the mechanical arm occupies at some point in time during the transition of the mechanical arm 602 from the starting position 606 to the ending position 608. During generation of a voxel map 610, each bit in the voxel map may be initialized with a value of 0. For each voxel occupied at some point in time (no matter how brief), the system may overwrite a bit associated with that voxel with a value of 1.

Figure 7:
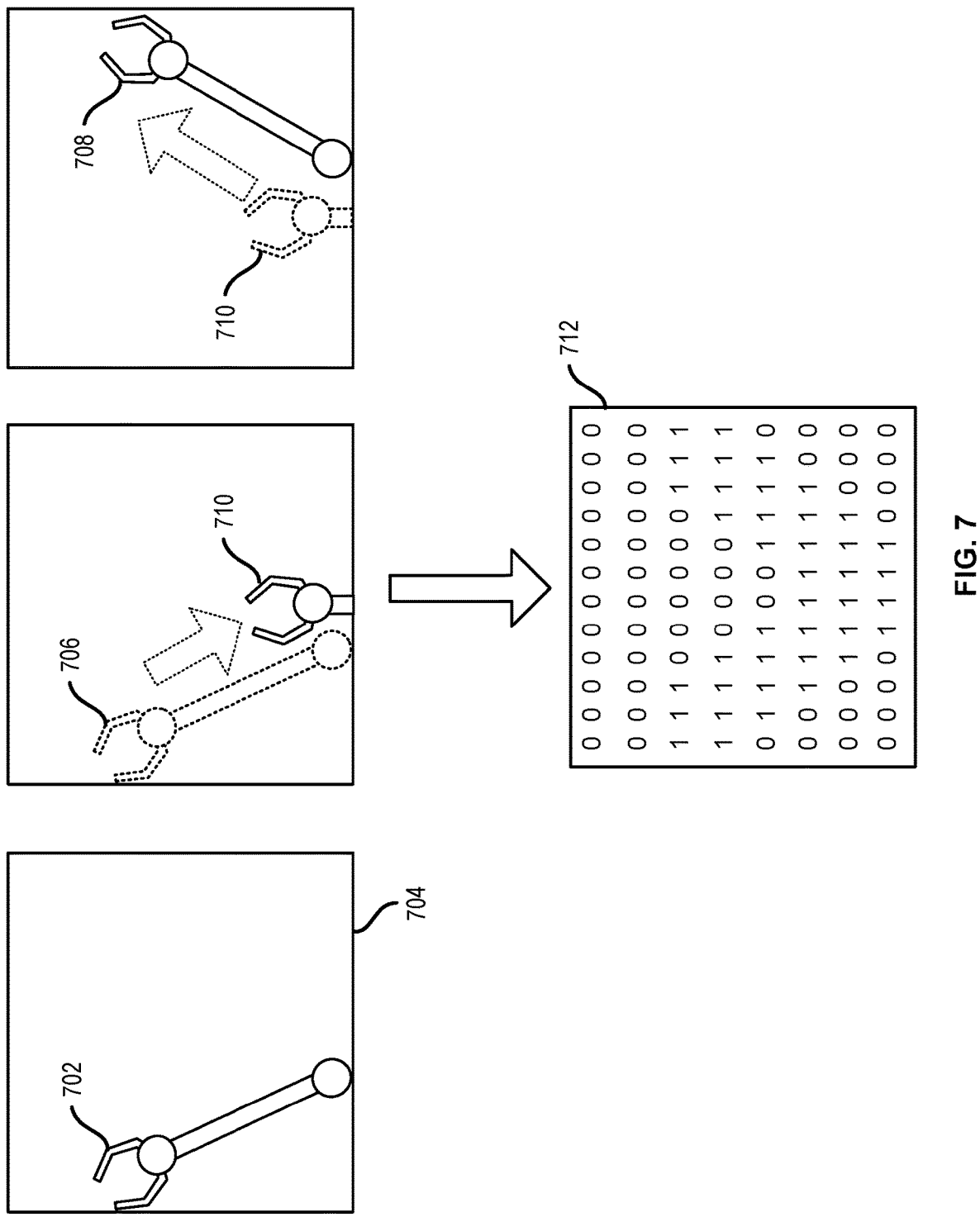
FIG. 7 depicts a second example of a movement voxel map that may be generated for a second repositioning option in accordance with at least some embodiments.

FIG. 7 depicts a second example of a movement voxel map that may be generated for a second repositioning option in accordance with at least some embodiments. In particular, FIG. 7 pertains to a repositioning option that includes a second method of moving a mechanical arm 702 through a three-dimensional space 704. In FIG. 7, the mechanical arm 702 is repositioned from a starting position 706 to an ending position 708 within the three-dimensional space 704. To do this, the mechanical arm 702 is moved from the starting position 706 to an intermediary position 710. The mechanical arm 702 is then moved from the intermediary position 710 to the ending position 708.

In some embodiments, the system may construct movement voxel maps for combinations of repositioning options (e.g., by using a bitwise OR operation). For example, to obtain a movement voxel map associated with the repositioning option depicted in FIG. 7, the system may generate a first movement voxel map associated with a repositioning option related to moving the mechanical arm 602 from the starting position 706 to the intermediary position 710. The system may then generate a second movement voxel map associated with a repositioning option related to moving the mechanical arm 602 from the intermediary position 710 to the ending position 708. Once each of these has been generated, the system may generate the movement voxel map 712 by comparing the first and second movement voxel map and performing a bitwise OR operation on each pair of corresponding bits in the respective movement voxel maps. The output of this operation may be written to the movement voxel map 712 as the combination of the repositioning options. A bitwise OR operation takes two bit patterns of equal length and performs the logical inclusive OR operation on each pair of corresponding bits. The result in each position is 0 if both bits are 0, while otherwise the result is 1.

In some embodiments, the robotic unit may include instructions to cause it to build a chain of repositioning options in order to perform the requested repositioning. For example, upon determining that the mechanical arm 702 is to be moved from the starting position 706 to the ending position 708, the system may identify any number of intermediary positions that can be reached from the starting position 706 and can position the mechanical arm 702 to move into the ending position 708. Each time that the system identifies a chain of such repositioning options, it may generate a movement voxel map corresponding to that chain of movements by using a bitwise OR operation to combine the movement voxel maps associated with each of the identified movements. In at least some of these embodiments, each movement voxel map generated in this manner may be subjected to the collision detection techniques described herein until one or more repositioning options are identified that result in no collision.

In some embodiments, movement voxel maps may be generated for each possible repositioning prior to initiation of a collision detection process. For example, the movement voxel map 610 of FIG. 6 and the movement voxel map 712 of FIG. 7 may be generated by the control unit 202 depicted in FIG. 2. In some embodiments, a library of movement voxel maps may be stored in memory of the robotic unit (e.g., by a manufacturer) which may be referenced during the processes described herein. In some embodiments, the library of movement voxel maps may include movement voxel maps for all possible repositioning events. In some embodiments, the library of movement voxel maps may include only movement voxel maps associated with basic repositioning movements, such that the robotic unit may be configured to build more complex chains from the available repositioning options.

Figure 8:
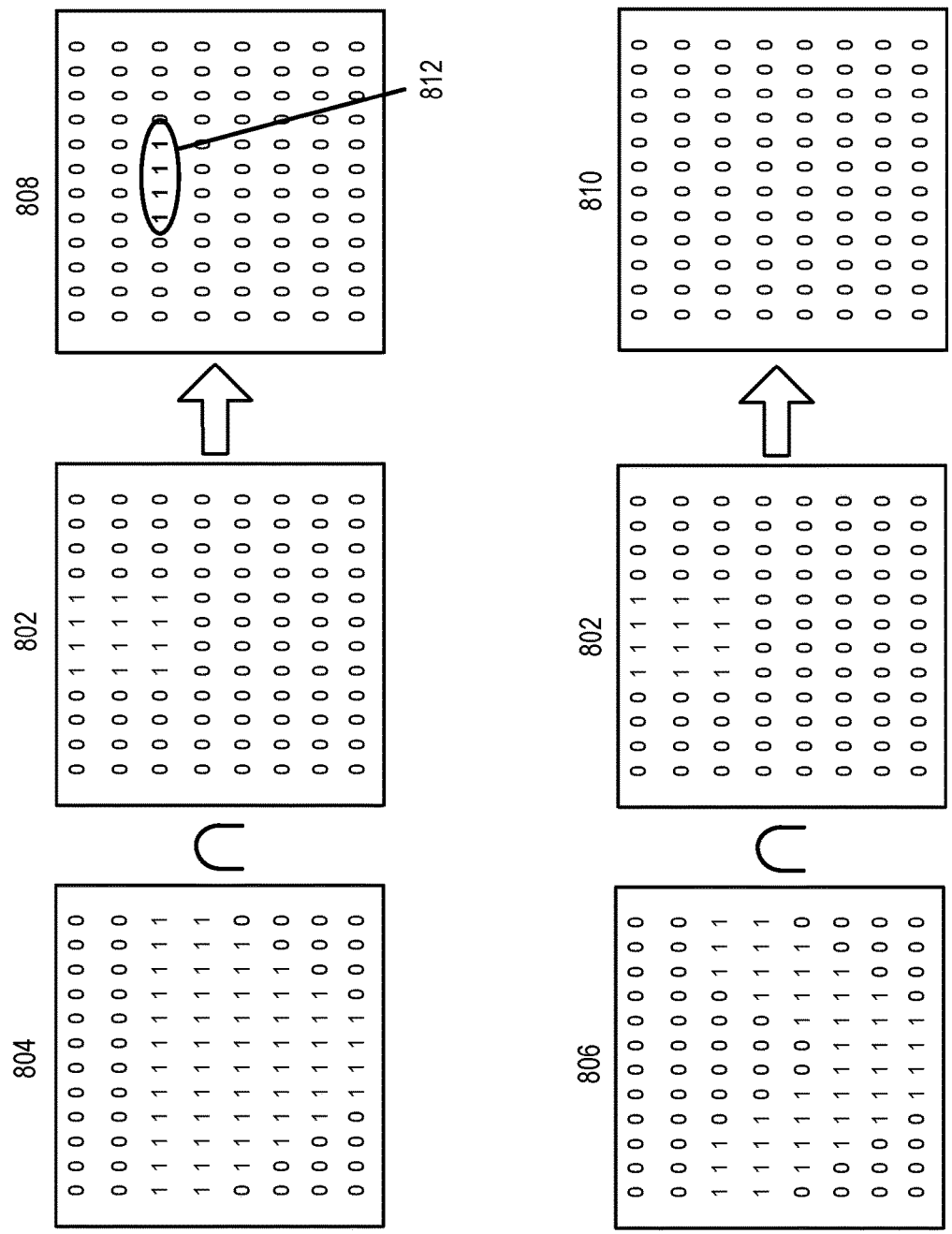
FIG. 8 depicts two examples in which a bitwise AND operation may be performed to detect potential collisions in accordance with at least some embodiments.

FIG. 8 depicts two examples in which a comparison operation may be performed to detect potential collisions in accordance with at least some embodiments. In FIG. 8, an area voxel map 802 associated with a three-dimensional space is compared to both a first movement voxel map 804 associated with a first repositioning option and a second movement voxel map 806 associated with a second repositioning option. The comparison of the area voxel map 802 associated with the three-dimensional space and the first movement voxel map 804 associated with the first repositioning option is depicted as result set 808. The comparison of the area voxel map 802 associated with the three-dimensional space and the second movement voxel map 806 associated with the second repositioning option is depicted as result set 810.

During a bitwise AND operation each bit in area voxel map 802 is multiplied by a bit in its same location within movement voxel map 804. In an integrated circuit, this may be done using an AND gate, with each of the bits in the pair of bits being provided as input. In some embodiments, multiple AND operations may be performed in parallel using multiple AND gates. For example, each of the bits in a first row of the voxel maps may be compared at the same time. In another example, some number of bits (e.g., two bytes (16 bits)) may be compared at once. The results of the multiplication are written to the result set 808.

In FIG. 8, result set 808, which includes the results of a bitwise AND operation performed with respect to the area voxel map 802 and the movement voxel map 804, is depicted. In the result set 808, a number of bits 812 are depicted as having a value of 1. This indicates that the movements associated with the movement voxel map 804 are likely to collide with one or more objects in the three-dimensional space represented by area voxel map 802. Accordingly, the first repositioning option associated with the first movement voxel map 804 is not a valid option.

Conversely, result set 810, which includes the results of a bitwise AND operation performed with respect to the area voxel map 802 and the movement voxel map 806, is also depicted. In the result set 810, no bits are depicted as having a value of 1. This indicates that the movements associated with the movement voxel map 806 are not likely to collide with one or more objects in the three-dimensional space represented by area voxel map 802. Accordingly, the second repositioning option associated with the second movement voxel map 806 is a valid option.

Figure 9:
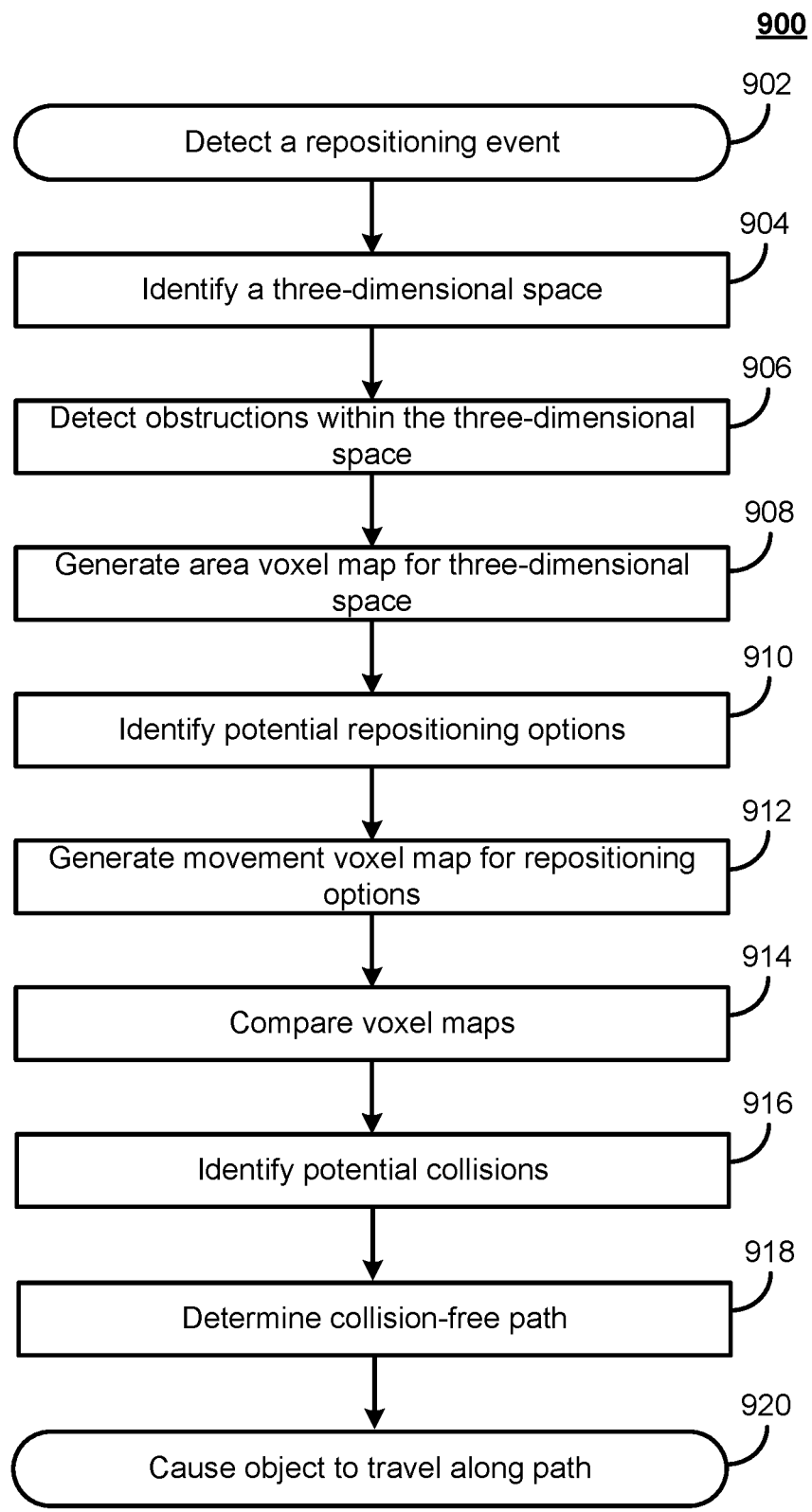
FIG. 9 depicts a flow diagram illustrating an example process for identifying potential collisions in accordance with at least some embodiments.

FIG. 9 depicts a flow diagram illustrating an example process for identifying potential collisions in accordance with at least some embodiments. The process 900 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 900 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 900 depicted in FIG. 9 may be performed by one or more of the control unit 202 and/or the robotic unit 204 as described with respect to FIG. 2 above. The code may be stored on a computer-readable storage medium, for example, in the form of a computer program including a plurality of instructions executable by one or more processors. The computer-readable storage medium may be non-transitory.

Process 900 may begin at 902, when a repositioning event is detected. In some embodiments, the system may identify one or more positions associated with the repositioning event, including at least a starting position and an ending position.

At 904, a three-dimensional space may be identified. The three-dimensional space may be identified based on one or more bounds of the repositioning event. For example, the three-dimensional space may be identified such that it includes at least the starting position and the ending position. In some embodiments, the three-dimensional space may also be identified such that it encompasses some amount of area around the starting position and the ending position. In some embodiments, the three-dimensional space may be identified as being of a particular size. For example, the system may identify a three-dimensional space that includes a particular number of voxels of a particular volume.

At 906, obstructions within the three-dimensional space may be identified. In some embodiments, obstructions may be identified using layout data (e.g., blueprints or other suitable design documents). In some embodiments, one or more input sensors may be used to identify obstructions within the three-dimensional space. For example, the input sensors may include at least a depth sensor that may be used to generate a range map which may be used to identify obstructions and their locations. In another example, the input sensors may include a camera device. In these examples, machine vision techniques may be used to identify obstructions within the image information obtained from the camera devices.

At 908, an area voxel map may be generated for the three-dimensional space. In some embodiments, the voxel map may be initialized as a data file having bits assigned a value of zero. The area voxel map may be generated by assigning a value of one to each bit that corresponds to a voxel which is determined to be at least partially occupied based on the detected obstruction data.

At 910, potential positioning options may be identified. In some embodiments, the potential repositioning options may be identified from a set of available repositioning options stored in memory based on the starting and ending positions. In some embodiments, the potential repositioning options may be generated dynamically as the repositioning event is detected.

At 912, movement voxel maps may be generated for each of the identified repositioning options. Some examples of methods that may be used to generate movement voxel maps from repositioning options are described with respect to FIG. 6 and FIG. 7 above. In some embodiments, movement voxel maps may be generated for a number of repositioning options prior to initiation of embodiments of this disclosure. In some cases, they may have been preloaded into memory by a manufacturer or administrator.

At 914, the area voxel map for the three-dimensional space may be compared to each of the movement voxel maps generated for the potential repositioning options. The comparison may involve performing a logical conjunction operation (e.g., a bitwise AND operation) between the area voxel map associated with the three-dimensional space and each of the movement voxel maps associated with the repositioning options.

At 916, potential collisions may be identified. In some embodiments, collisions may be identified when the logical conjunction operation results in a value of one. In some cases, the process 900 may exit upon detecting a value of one. Upon successfully completing the logical conjunction operation without detecting a value of one, the repositioning option associated with the movement voxel map may be identified as an appropriate repositioning option.

At 918, the system may identify a collision-free path based on the identified potential collisions. For example, the logical conjunction of step 914 may be performed with respect to a number of potential repositioning options. Based on these comparisons, the system may identify one or more collision-free paths that include those repositioning options determined to be valid. The system may then execute one of the repositioning options at 920.

Embodiments of the disclosure provide for a number of technical advantages over conventional systems. For example, bitwise operations are simple actions which are directly supported by the processor and used to manipulate values for comparisons and calculations. In embodiments that use an integrated circuit configured to perform the methods as described herein, bitwise operations are substantially faster than division, several times faster than multiplication, and sometimes significantly faster than addition. While some modern processors may perform addition and multiplication just as fast as bitwise operations (due to their longer instruction pipelines and other architectural design choices), bitwise operations use less power because of the reduced use of resources. Hence, embodiments of the disclosure consume less resources overall than conventional systems used for collision detection. Accordingly, the systems described herein results in a faster and less resource intensive method of performing collision detection than conventional systems.

Figure 10:
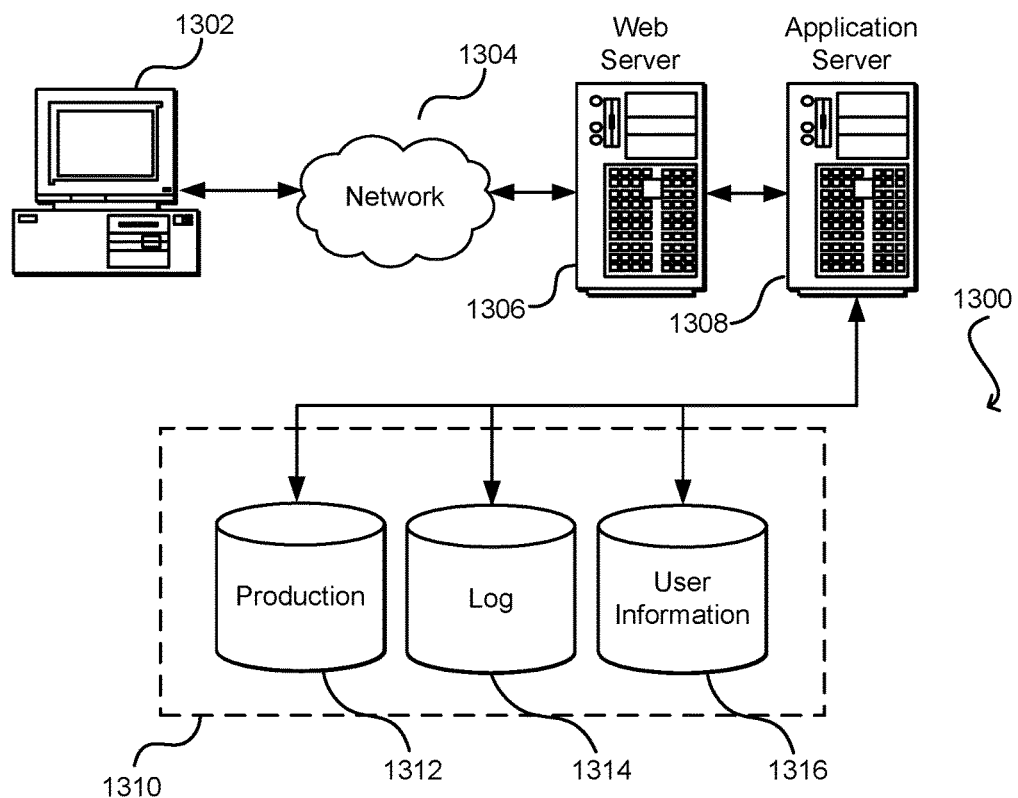
FIG. 10 illustrates an example environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   detecting a repositioning event including at least an indication of a starting position and an indication of an ending position;
   identifying a three-dimensional space that includes at least the starting position and the ending position;
   detecting one or more obstructions within the three-dimensional space;
   generating, based on the one or more obstructions, an area voxel map that represents the three-dimensional space;

identifying a set of repositioning options, individual repositioning options of the set of repositioning options determined to result in completion of the repositioning event;

identifying a set of movement voxel maps corresponding to the set of repositioning options;

detecting one or more potential collisions by comparing the area voxel map to individual voxel maps of the set of movement voxel maps, wherein comparing the area voxel map to individual movement voxel maps of the set of movement voxel maps comprises performing a bitwise logical comparison operation;

determining, based on the detected one or more potential collisions, a collision-free path that corresponds to a movement voxel map of the set of movement voxel maps, the movement voxel map determined to be free of a detected potential collision; and causing an object to travel along the collision-free path.

2. The method of claim 1, wherein determining the collision-free path comprises a bitwise logical comparison of movement voxel maps of the set of movement voxel maps.

3. The method of claim 1, the bitwise logical comparison operation corresponding to a bitwise AND operation, and wherein a potential collision is indicated when the bitwise AND operation results in a value of one.

4. The method of claim 1, wherein the individual repositioning options of the set of repositioning options are associated with a series of movements, the series of movements determined to result in a repositioning from the starting position to the ending position.

5. The method of claim 4, wherein the series of movements associated with at least one repositioning option comprises a repositioning from the starting position to at least one intermediary position and a repositioning from the at least one intermediary position and the ending position.

6. A system comprising:
a processor; and
a memory including instructions that, when executed by the processor, cause the system to, at least:
identify a three-dimensional space associated with a repositioning event;
detect one or more constraints of the three-dimensional space;
generate, based on the one or more constraints, an area voxel map associated with the three-dimensional space;
select a repositioning option calculated to result in completion of the repositioning event;
identify a movement voxel map associated with the repositioning option;
compare the area voxel map to the movement voxel map, wherein comparing the area voxel map to the movement voxel map comprises performing a bitwise logical comparison operation; and
provide an indication as to whether the repositioning option is determined to result in a collision based at least in part on comparing the area voxel map to the movement voxel map.

7. The system of claim 6, further comprising an integrated circuit configured to perform logical conjunction operations, wherein the area voxel map is compared to the movement voxel map using the integrated circuit.

8. The system of claim 7, wherein the integrated circuit is configured to compare multiple bits from the area voxel map and the movement voxel map in parallel.

9. The system of claim 6, further comprising one or more input sensors, wherein the one or more constraints are detected based on input received from the one or more input sensors.

10. The system of claim 9, wherein the one or more input sensors include at least a depth sensor.

11. The system of claim 9, wherein the one or more input sensors include at least a camera device, and wherein the one or more constraints are detected using machine vision techniques.

12. The system of claim 6, wherein the area voxel map comprises a first series of bits, individual bits of the first series of bits representing a volume in the three-dimensional space.

13. The system of claim 6, wherein the movement voxel map comprises a second series of bits, individual bits of the second series of bits representing an indication as to whether a volume is occupied for at least a portion of an execution of the repositioning option.

14. The system of claim 10, wherein the one or more constraints are detected using layout data as well as information obtained from the one or more input sensors.

15. A non-transitory computer readable medium storing specific computer-executable instructions that, when executed by a processor, cause a computer system to at least:
receive an area voxel map that comprises a representation of a first three-dimensional space, the area voxel map including indications of at least partially occupied volumes within the first three-dimensional space;
receive a movement voxel map that comprises a representation of a second three-dimensional space, the movement voxel map including indications of volumes within the second three-dimensional space which are at least partially occupied during execution of a repositioning option;
perform a logical conjunction of the area voxel map and the movement voxel map, the logical conjunction comprising a bitwise logical comparison operation; and
determine, based on a result set of the logical conjunction, whether execution of the repositioning option corresponding to the movement voxel map will result in a collision.

16. The non-transitory computer readable medium of claim 15, wherein the instructions further cause the computer system to cause execution of the repositioning option upon determining that the repositioning option will not result in a collision.

17. The non-transitory computer readable medium of claim 15, wherein the area voxel map and the movement voxel map each comprise corresponding voxels, wherein the voxels are not uniform in size.

18. The non-transitory computer readable medium of claim 17, wherein the movement voxel map is generated by performing a bitwise OR operation on voxel maps associated with individual movements in a series of movements.

19. The non-transitory computer readable medium of claim 15, wherein the first three-dimensional space is of equal size to the second three-dimensional space.

20. The non-transitory computer readable medium of claim 15, wherein the area voxel map is initialized with bits being set to zero, and wherein at least partially occupied volumes within the first three-dimensional space are indicated by setting bits associated with the at least partially occupied volumes to one.

* * * * *